United States Patent [19]

Marvel et al.

[11] 3,970,681

[45] July 20, 1976

[54] NITRILE TERMINATED AROMATIC POLYETHERS

[75] Inventors: Carl Shipp Marvel, Tucson, Ariz.; Jozef Verborgt, Brussels, Belgium

[73] Assignee: University Patents, Inc., Stamford, Conn.

[22] Filed: Aug. 27, 1974

[21] Appl. No.: 501,098

Related U.S. Application Data

[63] Continuation-in-part of Ser. No. 233,724, March 10, 1972, abandoned.

[52] U.S. Cl. .................... 260/465 F; 260/47 ET; 260/248 CS; 428/268

[51] Int. Cl.² ............... C07C 121/75; C07C 121/76

[58] Field of Search ................................ 260/465 F

[56] References Cited
UNITED STATES PATENTS 3,763,210   10/1973   Heath et al. .................... 260/465

*Primary Examiner*—Lewis Gotts
*Assistant Examiner*—Dolph H. Torrence
*Attorney, Agent, or Firm*—Dennis P. Clarke

[57] ABSTRACT

Nitrile group containing aromatic polyethers and the polymeric triazines formed by the trimerization and cross-linking thereof.

14 Claims, No Drawings

NITRILE TERMINATED AROMATIC POLYETHERS

RELATION TO OTHER APPLICATIONS

This application is a continuation-in-part application of application Ser. No. 233,724, filed Mar. 10, 1972, now abandoned.

BACKGROUND OF THE INVENTION

Filled resins, e.g., glass fiber and fabric reinforced resins, are well known as suitable materials for forming structural units in the air-craft and other industries. A wide variety of resins have been proposed in the past for formulating these structures and as laminating resins for joining various materials. For example, polyesters, epoxy resins, polycarbonates, etc., have been utilized as matrix resins for the glass fiber-resin laminates. One of the difficulties experienced in the use of these resins, however, is that they are difficult to mold and mechanically work. Thus, it is often necessary to apply the resin in liquid form to the glass fibers on substrate to be laminated and then solidify the composite in order to obtain a suitable product. The resins previously used had to be melted or dissolved in a suitable solvent in order to achieve the desired liquid form. Many of these resins, however, decompose or suffer some deleterious chemical change when heated to temperatures sufficiently high to achieve melting. The result is a laminate or reinforced resin with reduced strength and physical properties.

Moreover, many of the previously used resins are insoluble in conventional volatile solvents. In addition, when forming laminates utilizing solvent solutions of resins, it is necessary to employ special means for driving off and collecting those solvents which are capable of dissolving the resins but are relatively non-volatile.

In addition, the prior art matrix and laminating resins do not possess a sufficiently high degree of thermal stability which is requisite in many industrial applications.

It has been heretofore proposed to provide low melting laminating polymers. These polymers may be melted at low temperatures, contacted with the filler material or substrate to be laminated and cured or cross-linked to the resinous state. A serious disadvantage associated with these low-melting polymers, however, is that cross-linking involves a chemical reaction which liberates a volatile by-product such as $CO_2$, $H_2O$, etc.. The liberation of these reaction products operates to form voids in the resulting product. Obviously, the prior art low melting laminating polymers may not be used in applications requiring close tolerance or uniform compositions throughout.

It is an object of the invention to provide low melting polymers which may easily be admixed with fillers or contacted with substrates to be laminated and cross-linked to form a firmly bonded article having a uniform composition throughout.

It is a further object of the invention to provide novel reinforced and laminated resin compositions having high degrees of strength and thermal stability.

SUMMARY OF THE INVENTION

The above and other objects of the invention are achieved by providing low melting nitrile terminated aromatic polyethers having the structural formula:

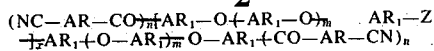

wherein:

AR and $AR_1$ are the same or different and are arylene groups;

Z is the same or different in each recurring unit and is selected from the group consisting of $—OC—AR_3—CO—$ and $—SO_2—AR_3—SO_2-$ wherein $AR_3$ is an arylene group;

X is 1 – 40;

m is 0 – 4, and n is 0 or 1, provided that when $n = o$, x is at least 3 and at least 3 $AR_3$ groups are cyanoarylene groups; and further provided that when n is 1, at least one $AR_3$ group is a cyanoarylene group.

These nitrile terminated aromatic polyethers readily polymerize and cross-link at relatively low temperatures to produce strong infusible resins. The polymerization and cross-linking take the form of trimerization of the nitrile groups to produce thermally stable triazine linkages. Moreover, the reactions occur without the liberation of void-forming volatile materials or in the materials of the prior art.

When the nitrile terminated aromatic polyethers of the invention are polymerized and crosslinked while in contact with a filler or substrate to be laminated, the result is a product having a high degree of strength and thermal stability wherein the crosslinked polymer is firmly adhered to the filler or substrate.

DETAILED DESCRIPTION OF THE INVENTION

In the above structural formula, AR is an arylene group, preferably a phenylene radical. More preferably, AR is a para- or meta- linked phenylene radical.

$AR_1$ is an arylene group, preferably a para- or meta- linked phenylene radical.

$AR_3$ is an arylene group, preferably a para- or meta- linked phenylene radical with at least one $AR_3$ group being a meta- or para- linked phenylene radical substituted by a nitrile group, i.e., $—C_6H_3CN—$. Most preferably, the nitrile group would be meta- to the other linkages of a meta-linked phenylene radical, i.e.,

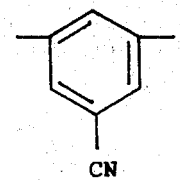

The advantage in the nitrile substituted $AR_3$ groups is the presence of nitrile groups along the chain of the polyether as well as the terminal ends. In the polyethers containing only terminal cyanoarylene groups, i.e., those of the above formula wherein n is 1 and none of the $AR_3$ groups contain a cyano radical, polymerization would occur by "chain extension". The nitrile group at the ends of the various polyether chains would trimerize to produce a linear, two-dimensional polymer.

According to the present invention, however, there is provided polyethers capable of cross-linking as well as polymerizing by chain extension. Thus, in addition to the terminal chain extending polymerization there would also occur cross-linking between the various extended chains by virtue of the intermediate nitrile groups trimerizing.

The result is a three-dimensional, cross-linked polymer as opposed to the above-described linear polymer which is uniquely very strong and infusible. Moreover, these reactions do not produce void-forming gaseous by-products, thereby resulting in a homogeneous, uniform product.

The low melting nitrile terminated aromatic polyethers of the invention may be prepared by a variety of methods. The most convenient is by reaction of a suitable polyether with a reactive aromatic compound in a Friedel-Crafts type polymerization.

For example, a suitable polyether may be polymerized with a suitable acyl halide, acid anhydride, ester or free acid. The polymer resulting from the polymerization of a polyether and a di-acyl compound may be further reacted with a monoacyl compound containing a nitrile group to produce the nitrile terminated polyether.

The nitrile terminated aromatic polyethers of the above formula wherein Z is —CO—$C_6H_3CN$—CO, AR and $AR_1$ are phenylene, $x$ is 1 and $m$ is 0 may be prepared according to the following reaction scheme:

ClCO-$C_6H_3$CN-COCl + 2$C_6H_5$ — O — $C_6H_5$ → 2HCl
+ $C_6H_5$ — O — $C_6H_4$—CO—$C_6H_3$CN—CO—$C_6$-
$H_4$—O—$C_6H_5$ [ + 2NC $C_6H_4$ COCl ] NC—$C_6$-
$H_4$—CO—$C_6H_4$—O—$C_6H_0$—$C_6H_3$CN—CO—$C_6$-
$H_4$—O—$C_6H_4$—CO——$C_6H_4$—CN + 2HCl

In the above reaction a large excess of diphenyl ether is employed to produce the polymer wherein $x$ is 1. Where equimolar or near equimolar amounts of ether are employed, a polyether terminated polymer wherein $x$ is greater than 1 is produced.

These reactions may be carried out under the well-known reaction conditions for Friedel-Crafts types of reactions. Generally, the reactants are dissolved in a suitable solvent together with an effective amount of a Friedel-Crafts catalyst, i.e., aluminum chloride, boron trifluoride, etc., and allowed to proceed at or near room temperature. Higher temperatures up to reflux temperatures may be used wherein the reaction rate is slow but are generally to be avoided since they are often accompanied by undesirable side reactions.

Upon polymerization, the terminal nitrile groups trimerize with themselves to produce a strong, infusible resin containing thermally stable triazine linkages. The terminal nitrile groups trimerize according to the following reaction scheme:

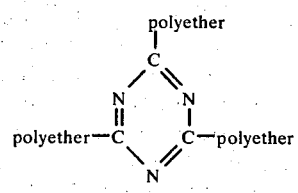

As is apparent, the intermediate terminal nitrile groups along the chain of the polyether molecule trimerize similarly to effect the cross-linking action.

Where the polyether contains only terminal nitrile groups, the curing reaction is more properly termed a chain extension since the various chains are extended by co-reaction of the terminal nitrile groups. In the preferred embodiment the polyether contains nitrile substituents in the interior portions of the chain, preferably in $AR_3$. Upon curing the latter polyethers, a true cross-linking of the various polyether chains is achieved as well as chain extension to produce a strong, infusible, thermally stable resin.

This cross-linking or curing reaction, as well as the polymerization reaction, have been found to occur in most instances by merely heating to a relatively low temperature. The temperature will depend in each case upon the particular nitrile terminated polyether to be cross-linked. Generally, however, temperatures from about 220° to about 300°C. are sufficient to effect cross-linking.

In some instances it may be necessary to employ a catalyst in order to achieve an efficient reaction rate. The Friedel-Crafts catalysts have been found to be most effective. Suitable such catalysts include zinc chloride, dibutyltin maleate, or the catalysts remaining in the reaction mixture following synthesis of the polyethers.

The low melting nitrile terminated aromatic polyethers of the invention are useful in the preparation of strong, infusible, highly insoluble glass or carbon fiber reinforced resin articles. Due to their low melting points and high degree of solubility in conventional solvents, it is a relatively simple matter to prepare the laminates with no deleterious effects on either the resin or the reinforcing material.

The nitrile terminated aromatic polyether is merely melted at low temperatures or dissolved in a suitable solvent and contacted with the fibrous reinforcing material. Generally, the polyethers of the invention melt at temperatures in the range of from about 165° to about 300°C., which is well below the elevated temperatures needed to liquefy the conventionally employed matrix resins and below the temperature necessary to cure or cross-link the polymer.

The liquefied nitrile terminated aromatic polyethers of the invention may be admixed with a body of loose glass or carbon fibers, coated on or impregnated in a glass fabric or cloth, and subsequently cured.

Upon polymerization and curing as described above, the polymer resinifies forming an extremely strong, infusbile, insoluble and, where desired, flexible laminate wherein the triazine linkage containing resin is firmly adhered to the reinforcing substrate. In addition, no voids are created in the cured product since no volatile by-products are produced during the curing reaction.

Where it is desired to utilize the polyethers of the invention in solution form a wide variety of volatile organic solvents may be employed, e.g., dimethyl formamide, dimethyl acetamide.

It is to be understood that the uses of the polyethers of the invention are not restricted to those listed above. Indeed, any compatible filler may be incorporated in the polyether prior to curing to provide products having a wide variety of properties.

In addition, the polyethers have been found to be excellent laminating adhesives for a wide variety of surfaces, e.g., metals, glass, plastics, etc. Moreover, they may be used as wire coatings due to their flexibility. They may also be melt spun to produce fibers which may then be set by curing and/or cross-linking to produce infusible fibers. The polyethers are also amenable to injection molding to provide a variety of shapes and structures.

EXAMPLE 1

This example is illustrative of the chemical reaction involved in forming the nitrile terminated polyether.

Five and three-tenths gram of m-hexaphenyl ether and 3.64 g of p-cyanobenzoyl chloride were dissolved in 100 ml of dry 1,2-dichloroethane. Seven g of AlCl$_3$ were added and the reaction mixture was refluxed under dry nitrogen during 4 hr. The mixture was cooled and poured into a large excess of methanol. It was reprecipitated twice from tetrahydrofuran into methanol. The yield of polyether was 60%. mp 130–133°C. The product was identified as

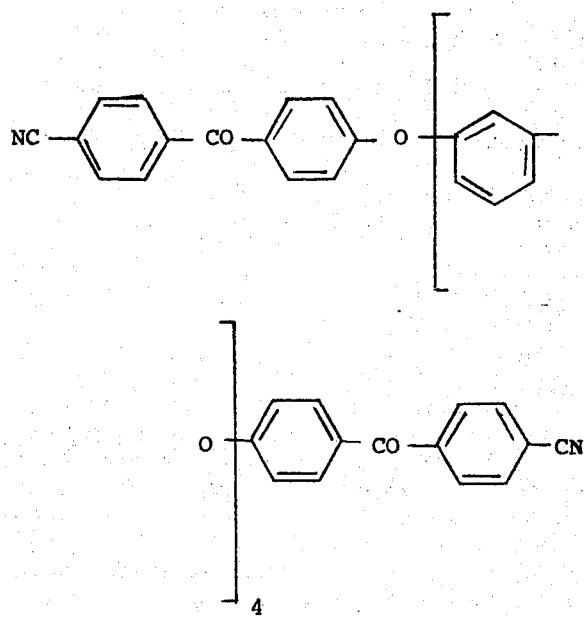

Anal. Calc.: C, 78.38%; H, 4.05%; N, 3.14%.
Found: C, 79.31%; H, 4.22%; N, 3.17%.

The polymer was polymerized by heating it under nitrogen at 220°C during 20 hr. It was extracted with tetrahydrofuran and dried under vacuum. 66% of an insoluble, infusible product was obtained.

Anal. Found: C, 79.88%; H, 4.43%; N, 3.04%.

Infrared analysis of the cured product indicated the absence of nitrile groups.

EXAMPLES 2–6

The experimental conditions and results of Examples 2–6 are set forth in Table I. One hundred ml of solvent was used for 5.3 g (1 millimole) of m-hexaphenyl ether. 7 grams of AlCl$_3$ catalyst was employed. The polymers were purified by precipitation three times from tetrahydrofuran into methanol.

TABLE I

| EXAMPLE | SOLVENT AND REACTION TIME | IPC[a] | CBC[b] | ηinh[c] | Analysis[d] C, % | H, % |
|---|---|---|---|---|---|---|
| 2 | nitrobenzene 20 hr at 80°C | 1 | — | 0.068 | — | — |
| 3 | 1,2 dichloroethane 4 hrs reflux | 1 | — | 0.088 | — | — |
| 4 | 1,2 dichloroethane 5 hr reflux | 0.96 | 0.08 | 0.094 | 79.46 | 4.35 |
| 5 | 1,2 dichloroethane 5 hr reflux | 0.96[e] | 0.08 | 0.075[f] | 79.38 | 4.48 |
| 6 | 1,2 dichloroethane 5 hr reflux | 0.99 | 0.025 | 0.128 | 79.35 | 4.31 |

[a]millimoles of isophthaloyl chloride.
[b]millimoles of p-cyanobenzoyl chloride.
[c]0.5g/100 ml DMF at 30°C.
[d]analysis calculated: C, 79.03%; H, 4.22%.
[e]terephthaloyl chloride was used in this run.
[f]only a small fraction of the polymer was soluble. Apparently polymerization occurred in this reaction.

The products of examples 2 and 3 have the following structural formula:

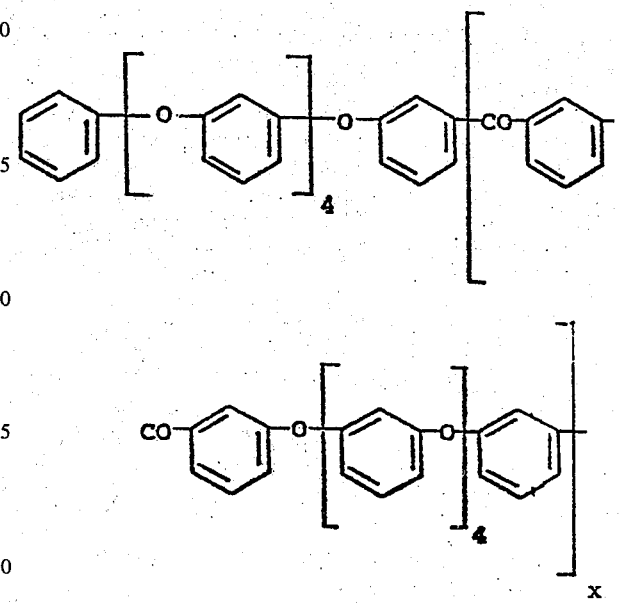

wherein $x$ is the degree of polymerization equivalent to the viscosity.

The products of examples 4 and 6 have the following structural formula:

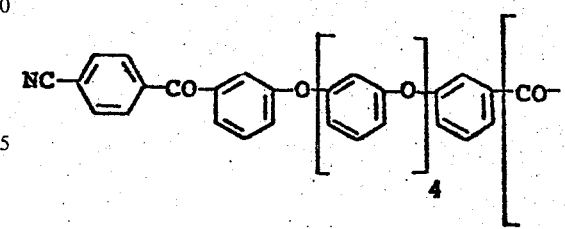

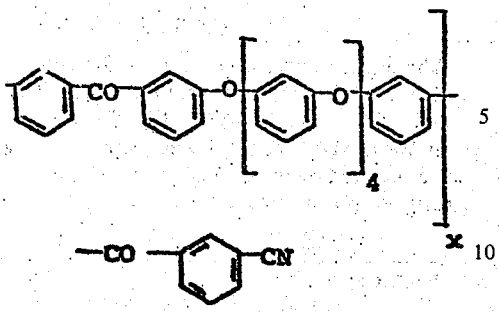

wherein x is the degree of polymerization equivalent to the viscosity.

The polymers of Examples 4, 5 and 6 were polymerized by heating at 225°C. under dry nitrogen for 20 hours. Reddish-brown resins which were completely insoluble in ethers, ketones, esters, hydrocarbons, dimethylacetamide, dimethyl sulfoxide and in sulfuric acid were obtained. No visible melting was observe up to 400°C. The polymerization resulted in only a small change in the analysis:

Example 4 - C, 80.13% H, 4.47%
Example 5 - C, 80.05% H, 4.39%
Example 6 - C, 80.23% H, 4.19%

This indicates the elimination of a negligible amount of by-products.

EXAMPLE 7

Twenty g of isophthaloyl chloride were dissolved in 400 ml of diphenyl ether. Twenty g of $AlCl_3$ were added and the mixture was heated at 80°C. under dry nitrogen during 20 hr. The mixture was washed with water, the organic layer separated and dried over $Na_2SO_4$. The excess of diphenyl ether was then distilled off under vacuum. The residue was recrystallized twice from acetone to yield a product having a mp 110°–111°C (Yield 66%). The product was identified as

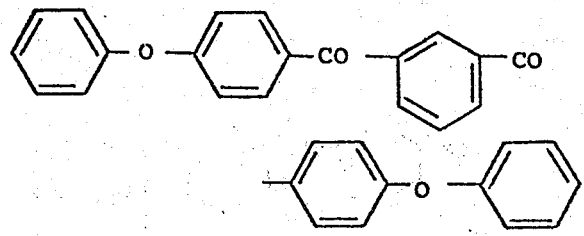

Anal. Calc.: C, 81.68%; H, 4.71%; O, 13.60%.
Found: C, 81.26%; H, 4.73%, O, 13.83%.

6.42 g of the above compound and 5.54 g of p-cyanobenzoy chloride were dissolved in 100 ml of 1,2-dichloroethane. Thirteen g of $AlCl_3$ were added and the mixture was stirred at room temperature under nitrogen during 24 hr. The mixture was poured into ice water, the precipitate was filtered and washed thoroughly with water. It was recrystallized twice from dimethyl formamide. The yield of product was 90%; mp 256°C. The product was identified as

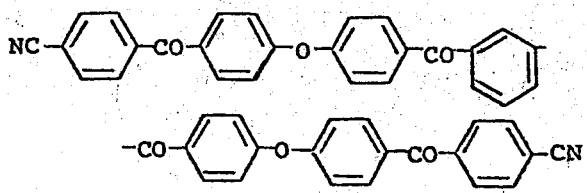

Anal. Calc.: C, 79.11%; H, 3.87%; N, 3.84%.
Found: C, 79.14%; H, 4.04%; N, 4.14%.

The final product was polymerized by heating it with 5% of anhydrous $ZnCl_2$ at 280°C during 20 hr. The product was ground, washed with water, and dried under vacuum. It was then stirred in sulfuric acid during 24 hr. The product was 85% insoluble in sulfuric acid. The soluble fraction had an $\eta_{inh}= 0.24$ (0.87 g/100 ml of sulfuric acid at 30°C). The infrared spectrum showed no nitrile absorption for the insoluble fraction, indicating trimerization of the nitrile groups to triazine linkages.

EXAMPLE 8

The following procedure was used to prepare 1,3-bis-[p-phenoxybenzoyl]-5-cyanobenzene.

Sixty g of 5-aminoisophthalic acid were dissolved in 85 ml of $HCl_{conc}$ and 85 ml of water. The mixture was cooled to 0°C and 25 g of $NaNO_2$ dissolved in 50 ml of water were added dropwise. The temperature was kept below 5°C.

Fifty g of NaCN were dissolved in 200 ml of water and 33 g of CuCN were added under stirring. Forty one and thirty hundredths g of $Na_2CO_3.H_2O$ was added and the mixture was heated to 60°C. The diazonium chloride solution was then added dropwise. The mixture was cooled and $HCl_{conc}$ was added until no more precipitate was formed. The precipitate was filtered off, washed with water and treated with 200 ml of $NH_4OH_{conc}$ to dissolve the acid. The mixture was filtered again and the filtrate acidified with $HCl_{conc}$. The precipitate was recrystallized from 800 ml of water and gave 30 g of pure 5-cyanoisophthalic acid. mp. 253°C.

Twenty-five g of 5-cyanoisophthalic acid were then refluxed in 100 ml of thionyl chloride for 4 hr. The 5-cyanoisophthaloyl chloride was purified by vacuum distillation. bp 121°C at 0.25 mm. mp 37°–38°C.

Eighteen and five tenths g of 5-cyanoisophthaloyl chloride were dissolved in 500 ml of diphenyl ether. Forty g of $AlCl_3$ were added and the mixture was stirred at room temperature under nitrogen during 24 hr. The mixture was washed with water and then dried over $Na_2SO_4$. The excess of diphenyl ether was distilled off under vacuum and the residue was recrystallized twice from alcohol. A 65% yield of compound was obtained. mp 167°–168°C.

Anal. Calc.: C, 79.99%; H, 4.87%; N, 2.83% O, 12.91%.

Found: C, 78.44%; 77.40%; 77.83%; H, 4.27%, 4.19%, 4.16%; N, 2.63%, 2.63%, 2.58%; O, 12.30%.

The carbon value was found to be quite low. However, the total of the four elements as an average did not exceed 97%. The following analysis resulted when this was taken into account. C, 80.16%; H, 4.28%; N, 2.76%; O, 12.67%.

This product was employed in the following examples to produce nitrile terminated polyethers containing nitrile groups in the intermediate portions of the chain.

EXAMPLES 9–18

The following general procedure was followed utilizing the conditions and proportions set forth in Table II.

100 millimoles of diphenyl ether and the acid chlorides (as indicated in Table II) were dissolved in dry 1,2-dichloroethane. A 10% excess of $AlCl_3$ was then added and the mixture was stirred under dry nitrogen.

The reaction mixture warmed up and cooling was sometimes necessary. A precipitate was usually formed after 5 minutes and stirring became difficult on large scale preparations. The precipitate was filtered off after 20 to 24 hr. and stirred in a large excess of methanol. It was washed three times with methanol in a blender and vacuum dried. The yield was usually 100%.

The endcapped polymers and the ones that have nitriles pending from the main chain were polymerized and cross-linked by heating them at 230°–250°C during 20–24 hr. Insolubility was obtained for some polymers after heating them for less than 1 hr.

Glass laminates were made as follows: The polymer and a piece of glass fiber cloth were wrapped in copper foil and put in a press under ± 200 psi. They were heated at 230°–250°C during 24 hr. The polymer flowed through the glass fiber cloth and adhered strongly.

The polymer of Example 9 has two recurring units:

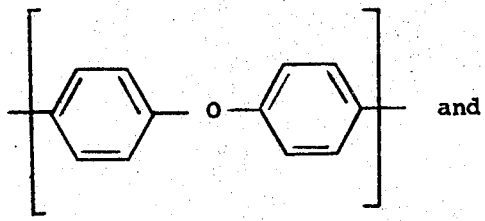

and

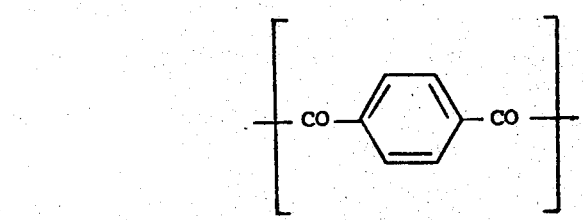

The polymer of Example 10 has two recurring units:

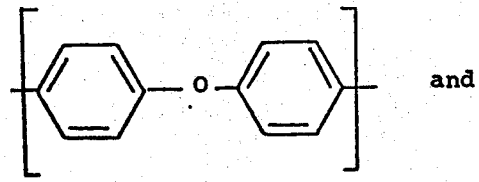

and

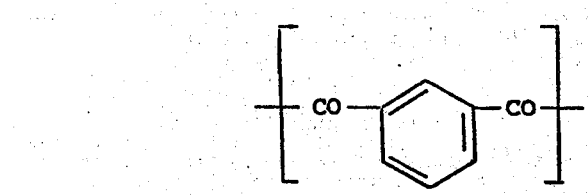

The polymer of Example 11 is the p-cyanobenzoyl terminated polymer of Example 10.

The polymers of Examples 12 and 13 are the p-cyanobenzoyl terminated polymers having three recurring units:

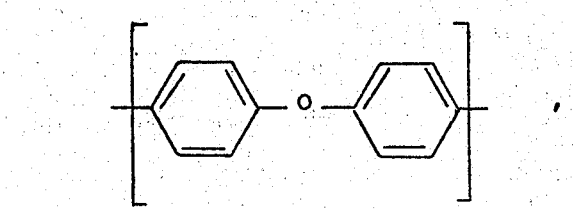

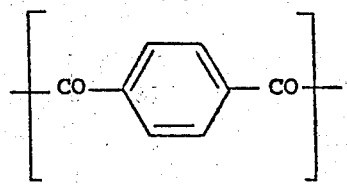

and

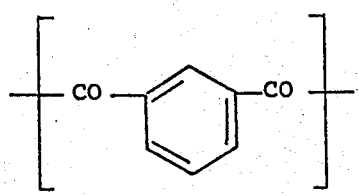

The polymer of Example 14 is a p-cyanobenzoyl terminated polymer having four recurring units:

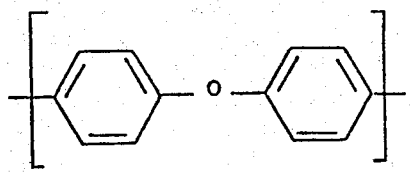,

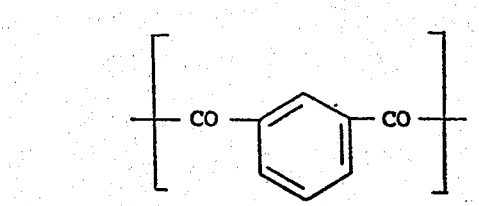,

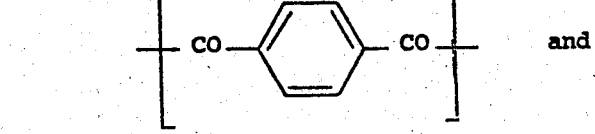 and

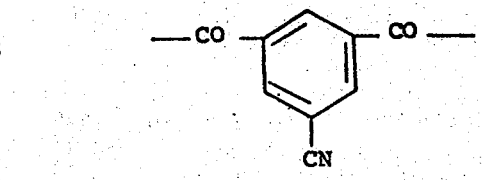

The polymers of Examples 15–18 are not nitrile terminated but contain intermediate nitrile substituents along the polyether chain. They correspond to those polyethers represented by the structural formula I where $n = 0$. They contain 4 recurring units:

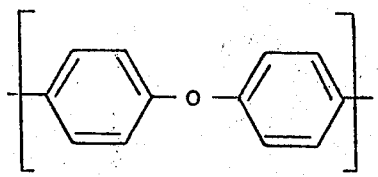 , 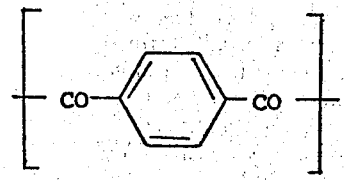 ,

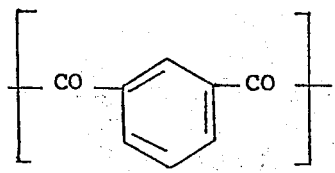 and

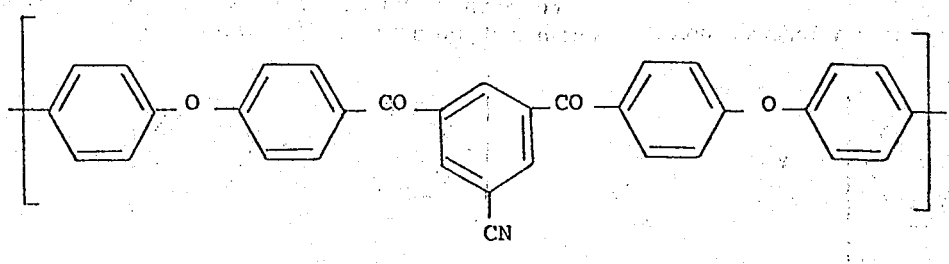

TABLE II

| EXAMPLE | IPC[a] | TPC[b] | CBC[c] | IV[d] | ηinh[e] | mp | C, % | Analysis[f] H, % | Res. |
|---|---|---|---|---|---|---|---|---|---|
| 9  | —    | 100 | —   | —  | 0.656       | > 370   | 79.73 | 4.34 | 1.86 |
| 10 | 100  | —   | —   | —  | 0.333       | 370–280 | 82.28 | 4.03 | 1.27 |
| 11 | 98.8 | —   | 1.2 | —  | 0.666       | 280–300 | 76.05 | 4.04 | 2.89 |
| 12 | 65.5 | 33  | 2.5 | —  | 0.314       | 255–250 | 78.17 | 3.99 | 1.53 |
| 13 | 50   | 49  | 1.0 | —  | polymerized | —       | 77.34 | 3.99 | 0 |
| 14 | 67   | 30  | 1.2 | 2[g] | 0.366     | 210–220 | 80.15 | 4.33 | 0 |
| 15 | 68   | 34  | —   | 2  | 0.970       | 210–220 | 79.70 | 4.07 | 0.47 |
| 16 | 68   | 34  | —   | 2  | 0.828       | 210–220 | —     | —    | — |
| 17 | 68   | 34  | —   | 2  | 0.511       | 200–220 | 79.01 | 4.01 | 0.31 |
| 18 | 68   | 34  | —   | 2  | 1.128       | 210–220 | 78.03 | 3.95 | 0.51 |

[a]millimoles of isophthaloyl chloride.
[b]millimoles of terephthaloyl chloride.
[c]millimoles of p-cyanobenzoyl chloride.
[d]millimoles of Example 8 compound.
[e]inherent viscosity at 30°C in $H_2SO_4$ (0.5 g/100 ml).
[f]analysis calculated: C, 79.97%; H, 4.03%.
[g]5-cyanoisophthaloyl chloride was used instead of Example 8 compound.

Upon polymerizing the polyethers of Examples 15–18, there is no pure "chain extension" as in the case of Example 14 since they are not strictly speaking nitrile "terminated" polyethers. However, by virtue of the fact that the polyether chain contains numerous cyanoarylene groups along this polyether chain, polymerization thereof does produce the same type of 3-dimensional cross-linking effect as is the case with the product of Example 14. Thus, whereas some of the cyano groups of the respective polyethers are "chain extending", so to speak, others in the extending chains are cross-linking with other extending chains to produce the 3-dimensional infusible product. Therefore, it is apparent that the polyethers need not be nitrile terminated in order to achieve the benefit of the invention. It is only necessary that at least 3 cyanoarylene groups be present in the polyether as described above.

All the polymers were insoluble in nitrobenzene and in dimethyl formamide. Polymerization by trimerization of the nitriles was obtained for the polymers of Examples 12–18 (except 13) by heating them without adding catalysts. This did not result in complete insolubility for the polymer of Example 12. This polymer was still 70% soluble in sulfuric acid after a 20 hr heating period at 290°C. However, its viscosity was increased greatly. The viscosity was followed as a function of the time. The results are given in Table III.

TABLE III

CROSSLINKING OF POLYMER OF EXAMPLE 12 at 290°C

| time (hr) | % soluble | ηinh (0.5 g in 100 ml $H_2SO_4$ at 30°C) |
|---|---|---|
| 0    | 100 | 0.314 |
| 0.25 | 100 | 0.794 |
| 0.5  | 100 | 0.875 |
| 1.0  | 100 | 0.910 |
| 2.5  | 99  | 1.010 |
| 3.5  | 99  | 1.020 |
| 20.0 | 70  | 1.343 |

The polymers of Examples 14–18 were polymerized and cross-linked by a 20 hr heating period at 235°C without catalysts. This resulted in completely insoluble products that did not melt up to 400°C. The polymers adhered strongly to glass fibers and tough flexible laminates were obtained for all except the polymer of Example 14 which gave a more brittle material. The cross-linking resulted in a strongly decreased penetration in the softening tests.

Tests showed that the polymers are stable to 400°C under nitrogen and under static air.

EXAMPLE 19

One hundred thirty g of 1,3-m-benzenedisulfonyl chloride were dissolved in 1.5 liter of dry diphenyl ether. Five g of sublimed FeCl₃ were added and the mixture was stirred under dry nitrogen at 140°C during 15 hr. The mixture was washed with water and then dried over Na₂SO₄. The excess of diphenyl ether was distilled off under vacuum and the residue was distilled twice via a short path. bp ± 400°–420°C at 0.06 mm. The glassy solid was dissolved in 200 ml of CHCl₃ and precipitated as a white powder into 2 liters of diethyl ether. The product was identified as

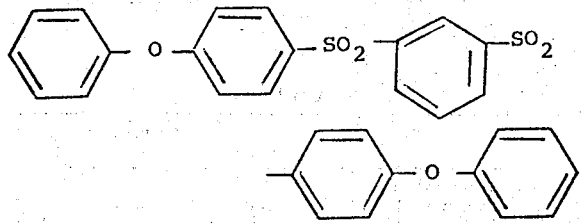

Anal. Calc.: C, 66.40%; H, 4.09%; S, 11.82%; O, 17.69%.

Found: C, 66.28%; H, 4.31%; S, 11.55%; O, 17.48%.

6.5 g of the above compound and 4.14 g of p-cyanobenzoyl chloride were dissolved in 50 ml of 1,2-dichloroethane. Seven g of AlCl₃ were added and the mixture was refluxed during 4 hr. The reaction mixture was poured into ice water and washed thoroughly. The organic layer was separated and the solvent was removed under reduced pressure. The residue was recrystallized from ethanol/tetrahydrofuran (1/1) and gave a 90% yield of a compound (mp 110°C.) identified as

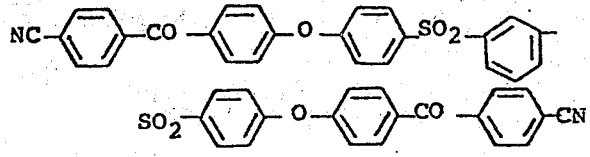

Anal. Calc.: C, 68.98%; H, 3.52%; N, 3.49%; S, 8.00%.

Found: C, 69.35%; H, 3.77%; N, 3.49%; S, 7.80%.

Polymerizing the Polymer 1.5 g of the polymer and 0.5 g of anhydrous ZnCl₂ were heated in a sealed tube at 295°C. during 22 hr. The product was ground and extracted with water and then with tetrahydrofuran. It was dried under vacuum. The yield of insoluble product was 66%.

EXAMPLES 20–28

These examples illustrate the production of polymers from 1,3-bis[p-phenoxybenzenesulfonyl] benzene.

The general procedure of Examples 9–18 was followed employing the reactants set forth in Table IV. Sufficient AlCl₃ was added to complex the sulfone and carbonyl groups as well as the nitrile groups present in the reaction mixture. The yield of polymer was generally higher than 90%. The reactions were carried out in 1,2-dichloroethane.

TABLE IV

| Example | IPC[a] | TPC[b] | CBC[c] | ClPC[d] | ηinh[e] | mp | C, % | Analyses[f] H, % | S, % | Res. % |
|---|---|---|---|---|---|---|---|---|---|---|
| 20 | 96.7 | — | 3.3 | — | 0.124[g] | 165–175 | — | — | — | — |
| 21 | 98.3 | — | 1.7 | — | 0.650 | 185–195 | 67.31 | 3.57 | 8.20 | 0 |
| 22 | 97.4 | — | 2.6 | — | 0.330 | 180–190 | 66.34 | 3.73 | 8.73 | 3.82 |
| 23 | 67.7 | 30.0 | 2.3 | — | 0.585 | 185–195 | 67.79 | 3.65 | 8.58 | 1.32 |
| 24 | 70.0 | 35.0 | — | 5.0[h] | 0.432 | 185–195 | 67.48 | 3.65 | 8.52 | 0 |
| 25 | 73.3 | 33.3 | — | 6.6[h] | 0.693 | 200–215 | 67.48 | 3.73 | 9.27 | 3.52 |
| 26 | 94.4 | — | — | 5.6 | 0.512 | 190–205 | 66.72 | 3.59 | 9.45 | 0.49 |
| 27 | 97.0 | — | — | 3.0 | 0.599 | 190–205 | 67.30 | 3.60 | 9.60 | 0.52 |
| 28 | 88.0 | — | — | 12.0 | 0.955 | 190–210 | 67.17 | 3.57 | 9.26 | 0.82 |

[a]millimoles of isophthaloyl chloride.
[b]millimoles of terephthaloyl chloride.
[c]millimoles of p-cyanobenzoyl chloride.
[d]millimoles of 5-cyanoisophthaloyl chloride.
[e]0.5 g/100 ml sulfuric acid at 30°C.
[f]the analysis is corrected for the residues. Calc.: C, 67.64%; 3.88%; S, 9.50%.
[g]only a small fraction of soluble material was obtained.
[h]compound of example 8 was used instead of 5-cyanoisophthaloyl chloride.

The polymers of Examples 20–22 are p-cyanobenzoyl terminated polyethers containing 2 recurring units:

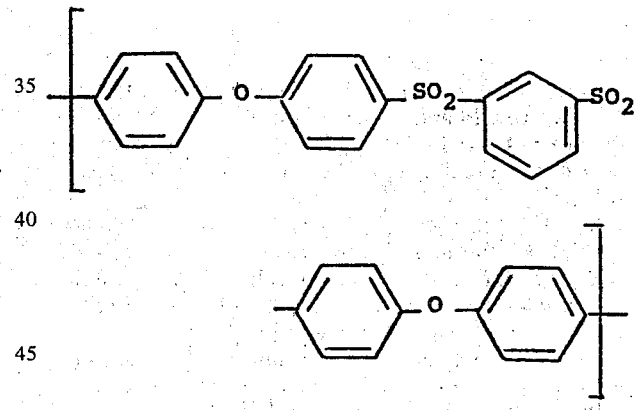

and

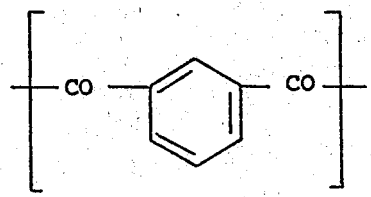

The polymer of Example 23 differs from that of Example 22 in that it additionally contains the recurring unit:

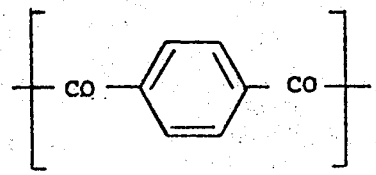

The polymers of Examples 24 and 25 contain 4 recurring units:

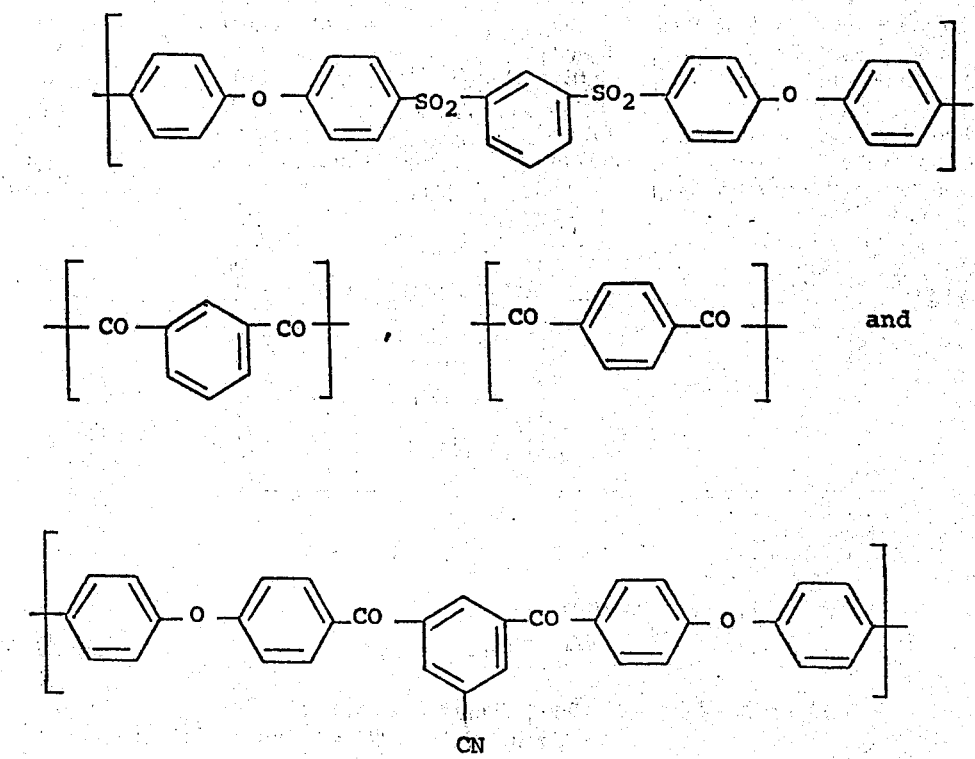

The polymers of Examples 26–28 are similar to those of Examples 24 and 25 except that they do not contain the terephthaloyl recurring unit and contain recurring 5-cyanoisophthaloyl units instead of 1,3-bis-[p-phenoxybenzoyl]-5-cyanobenzene units.

The polymers of Examples 24–28 correspond to those of the structural formula I wherein n is o. Polymerization of these polymers results in a cross-linking with a modified type of chain extension as described above in connection with Examples 15–18.

All these polymers were soluble in nitrobenzene, dimethyl formamide and in dimethyl acetamide.

Polymerization did not occur when these polymers were heated at 250°C. during periods as long as 48 hr and the viscosities did not change very much. Addition of 5% weight of dibutyltin maleate to polymers of Examples 20–24 gave flexible laminates when cured with glass fabric. The polymers of Examples 24–28 were dissolved in dimethyl formamide and 5% weight of anhydrous $ZnCl_2$ was added. Glass fiber cloth was impregnated with the resulting viscous solution and the solvent was then evaporated under vacuum. The brittle laminates that were obtained this way were heated at 235°C during 20 hr. The resulting laminates were strong and flexible. The polymers were insoluble in sulfuric acid and no melting point was observed after this curing stage.

EXAMPLE 29

Three ply laminates of glass cloth were prepared and tested for flexural strength at room temperature (ASTMD-1002). Sheer tests at room temperature of lap panels of titanium were also conducted to test the adhesive strength. The results are set forth in Table V. The polymers are listed by their Example number.

TABLE V

| | Polymers | | |
|---|---|---|---|
| | 25 | 26 | 27 |
| Room Temperature Flexural strength × $10^3$ psi | 90.3 | 68.1 | 79.7 |
| Modulus × $10^6$ psi | 2.8 | 3.37 | 3.26 |
| Specific gravity | 1.741 | 1.873 | 1.760 |
| Resin content | 34.0% | 22.5% | 14.0% |
| Flexural strength at 200°F × $10^3$ psi | 38.9 | 35.8 | 47.9 |
| Modulus at 200°F | 2.04 | 2.53 | 2.54 |
| Sheer Test Values | 3310 | 1530 | 1130 |

The preferred polyethers are those containing intermediate nitrile groups along the polyether chain as well as terminal nitrile groups. Curing of these preferred polyethers results in a cross-linked as well as a chain-extended and branched resin.

What is claimed is:

1. Low melting aromatic polyethers having the structural formula:

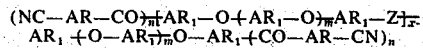

wherein:
AR and $AR_1$ are the same or different and are arylene groups;
Z is the same or different in each recurring unit and is selected from the group consisting of — OC — $AR_3$ — CO — and —$SO_2$ — $AR_3$ — $SO_2$ — wherein $AR_3$ is an arylene group;
x is 1–40;
m is 0–4, and $n$ is 0 or 1, provided that when $n = 0$, $x$ is at least 3 and at least three $AR_3$ groups are cyanoarylene groups; and further provided that when $n$ is 1, at least one $AR_3$ group is a cyanoarylene group.

2. The polyethers of claim 1 wherein:
   $n$ is 1, and
   AR and $AR_1$ are phenylene radicals.

3. The polyethers of claim 1 wherein:
   $AR_3$ is selected from the group consisting of phenylene and cyanophenylene radicals.

4. The polyethers of claim 3 wherein said cyanophenylene radical is a 5-cyanophenylene radical.

5. The polyethers of claim 4 wherein Z is $-OC-AR_3-CO-$.

6. The polyethers of claim 4 wherein Z is $-SO_2-AR_3-SO_2-$.

7. The polyethers of claim 2 wherein $m = 4$.

8. The polyethers of claim 4 wherein $m = 0$.

9. The polyethers of claim 1 wherein:
   $n$ is 0, and
   AR and $AR_1$ are phenylene radicals, the terminal $AR_1$ groups being phenyl groups.

10. The polyethers of claim 9 wherein;
    $AR_3$ is selected from the group consisting of phenylene and cyanophenylene radicals.

11. The polyethers of claim 10 wherein said cyanophenylene radical is a 5-cyanophenylene radical.

12. The polyethers of claim 11 wherein Z is $-OC-AR_3-CO-$.

13. The polyethers of claim 11 wherein Z is $-SO_2-AR_3-$.

14. The polyethers of claim 11 wherein $m = 0$.

* * * * *

UNITED STATES PATENT OFFICE
CERTIFICATE OF CORRECTION

PATENT NO. : 3,970,681
DATED : July 20, 1976
INVENTOR(S) : CARL SHIPP MARVEL and JOZEF VERBORGT It is certified that error appears in the above—identified patent and that said Letters Patent are hereby corrected as shown below:

Column 18, line 16 should read $--_2-AR_3-SO_2--$.

Signed and Sealed this

Seventh Day of December 1976

[SEAL]

Attest:

RUTH C. MASON
*Attesting Officer*

C. MARSHALL DANN
*Commissioner of Patents and Trademarks*